United States Patent [19]
Brudnak, Jr. et al.

[11] 3,916,606
[45] Nov. 4, 1975

[54] ROTARY MOWER

[75] Inventors: Andrew Brudnak, Jr., Oak Lawn; Jerrold A. Isaacson, Lombard, both of Ill.

[73] Assignee: International Harvester Company, Chicago, Ill.

[22] Filed: Nov. 4, 1970

[21] Appl. No.: 86,933

Related U.S. Application Data

[63] Continuation of Ser. No. 768,672, Oct. 18, 1968, abandoned.

[52] U.S. Cl. .................... 56/13.4; 56/6; 56/320.2; 56/DIG. 22
[51] Int. Cl. ............................................ A01d 55/18
[58] Field of Search ............. 56/6, 11.6, 13.4, 13.6, 56/320.2

[56] References Cited
UNITED STATES PATENTS

| | | | |
|---|---|---|---|
| 2,898,723 | 8/1959 | Goodall | 56/13.6 |
| 3,107,472 | 10/1963 | Witt et al. | 56/320.2 |
| 3,115,741 | 12/1963 | Robinson | 56/6 |
| 3,245,209 | 4/1966 | Marek | 56/13.4 |
| 3,263,406 | 8/1966 | Hanson et al. | 56/11.6 |
| 3,469,376 | 9/1969 | Bacon | 56/6 |

*Primary Examiner*—Russell R. Kinsey
*Attorney, Agent, or Firm*—Dennis K. Sullivan; Floyd B. Harman

[57] ABSTRACT

A mower such as for mounting on a tractor, having multiple cutter blades mounted on vertical axes and arranged in a line leading to a side discharge opening, the cutter blades rotating at progressively greater tip speeds toward the discharge opening.

6 Claims, 3 Drawing Figures

3,916,606

ROTARY MOWER

This application is a continuation of U.S. application Ser. No. 768,672 filed Oct. 18, 1968 and now abandoned.

BACKGROUND

The mower of the present invention is of a generally known type, being adapted for mounting on a tractor and having a downwardly opening hood and a plurality of cutter blades mounted in the hood for rotation on vertical axes. The cutter blades are arranged generally in a pattern of a triangle having a central cutter blade that is disposed generally forwardly and two side cutter blades disposed somewhat rearwardly of the central cutter blade. The housing has a side discharge opening adjacent the corresponding one of the small cutter blades, and the cut material is conveyed transversely and out through the discharge opening by the cutter blades, the one cutter blade near the discharge opening producing the final conveying or impelling action on the cut material in its passage out through the opening.

OBJECTS OF THE INVENTION

A broad object of the invention is to provide a mower of the foregoing general type including novel construction and arrangement for improving the conveyance of the cut materials transversely to and through the discharge opening.

Another object is to provide a mower of the foregoing general character in which the conveyance of the cut materials is provided by producing a more direct and efficient air stream for so conveying the cut materials.

A more specific object is to provide a mower of the foregoing general character in which the improvement in the air stream is provided by progressively increasing the peripheral speeds of the cutter blades in a direction leading to the discharge opening, so that each cutter blade produces a portion of the air stream of greater speed than the preceding cutter blade.

Still another object is to provide a mower construction of the foregoing general character in which, by reason of the improved conveyance of the cut materials, an improved cutting operation is achieved.

DESCRIPTION OF A PREFERRED EMBODIMENT

Figure 1:
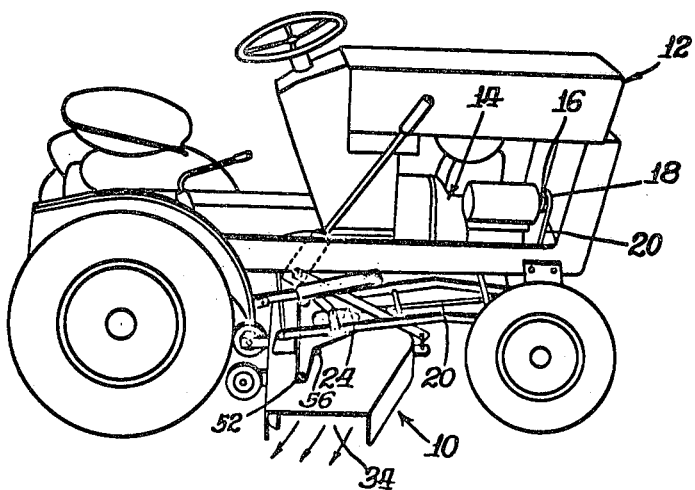
FIG. 1 is a perspective view of a mower embodying the features of the present invention, mounted on a tractor.

In FIG. 1 the mower is shown in its entirety at 10, mounted on a tractor 12 of known kind. The mower is generally similar in size and shape to mowers heretofore known, such as disclosed in Marek U.S. Pat. No. 3,245,209, issued Apr. 12, 1966, and assigned to the assignee of the present invention. The tractor need not be described in detail, and additionally the mounting of the mower itself on the tractor may be of a kind heretofore known, the mower being mounted under the tractor.

The tractor 12 incorporates a suitable power plant 14 having an output element 16 including a grooved pulley 18 on which is trained a drive belt 20. The belt 20 extends downwardly and then under idler pulleys 22 and then rearwardly under the power plant and over the mower where it is trained on a driven pulley 24 which is part of the mower itself.

The mower is of generally triangular shape having an apex 26 extending in leading direction and includes a housing member 28 having a flat top element 30 and a depending wall means indicated generally at 32 defining a laterally directed discharge opening 34 which in this instance is directed toward the right. The housing thereby forms a downwardly opening interior space, and the depending wall means will be described more in detail hereinbelow.

The mower includes three cutter blades 36, 38, 40 within the housing mounted for rotation on vertical axes, the cutter blades being arranged in a line, although not a straight line, extending generally transversely from a remote position toward the discharge opening 34. The central blade 38 is disposed generally forwardly, extending into the apex of the triangle, while the other two cutter blades 36, 40 are arranged to the side and rearwardly of the central cutter blade.

The cutter blades 36, 38, 40 are mounted in any suitable manner in the top element 30 of the housing, on shafts mounted in bearings supported by the top element. For example the central cutter blade 38 is mounted on a shaft 42 on which the driven pulley 24 identified above also is mounted, and mounted on this shaft is another pulley 44 below the driven pulley 24, but above the top element 30. The cutter blade 36 is mounted on a shaft 46 on which is secured another pulley 48, above the top element 30, and similarly, the cutter blade 40 is mounted on a shaft 50 on which is secured a pulley 52 above the top element 30. A belt 54 is trained on the three pulleys 44, 48, 52, these pulleys being of course grooved and a belt tightener pulley 56 is suitably mounted for tightening the belt. Upon the pulley 24 being driven by the tractor as indicated above, the other pulleys 44, 48, 52 and the cutter blades are correspondingly driven, all in the same direction, namely counterclockwise as viewed in FIG. 2, as indicated by the arrows 58, thereby conveying the cut materials transversely to the discharge opening 34. The cutter blades are driven at differential speeds - a principal feature of the invention - as described hereinbelow. The differential speeds are preferably produced by providing pulleys (44, 48, 52) of corresponding sizes.

Figure 2:
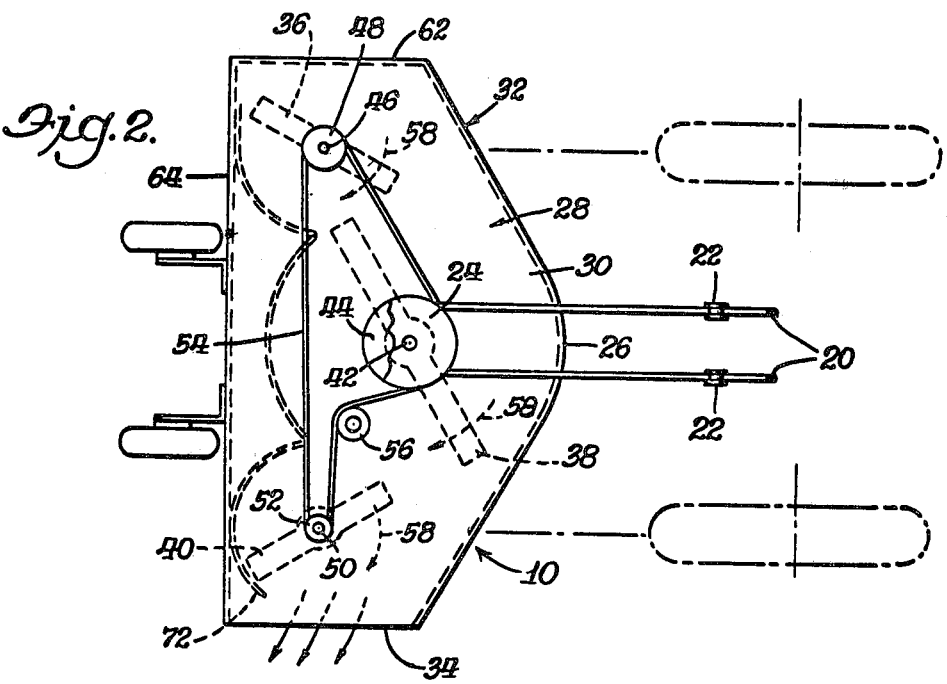
FIG. 2 is a plan view of the mower and showing its position on the tractor as represented by the tractor wheels.
Figure 3:
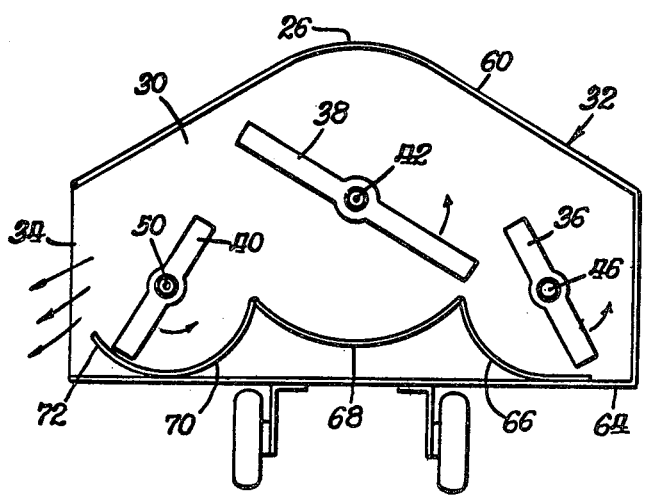
FIG. 3 is a bottom view of the mower.

The downwardly depending wall means 32 includes a leading element extending along the front side, i.e., across the apex 26 and to the sides; at one side, the left side as viewed in FIG. 2, it includes another element 62 and at the rear side is a further element 64, leading to the opposite side and continuing the surrounding of the space under the hood to the discharge opening 34.

Additional downward depending elements are provided in juxtaposition to the cutter blades themselves, namely curved or arcuate elements 66, 68, 70 disposed closely adjacent the path of the tips of the blades and generally opposed to the front or leading wall element 60. At the one end, adjacent the blade 36, the arcuate element 66 is adjacent the end element 62 while at the other end the arcuate element 70 has a terminal tip 72 at the discharge opening 34. The arcuate elements 66, 68, 70 form with the front element 60 and the end element 62 a general enclosure on effectively front and rear opposite sides of the cutter blades to define an enclosure opening only through the discharge opening 34.

The overall construction of the components and elements of the mower referred to above may be generally similar to the construction disclosed in the above mentioned patent, including the specific construction of the cutter blades themselves which is such as to lift, by suction, the grass or other plant stalks so that they extend upwardly, whereby a better cutting operation is performed.

For convenience the cutter blades 36, 40 may also be referred to as the remote cutter blade and the near cutter blade respectively, this relationship being from the standpoint of their proximity to the discharge opening 34. The effect of each cutter blade is transmitted to the successive one in a line leading to the discharge opening. The action of the remote cutter blade 36 is such that it cuts the plants in its line, or swath, and throws the cut particles into the operational area of the next cutter blade 38. The curved or arcuate element 66 in conjunction with the forward element 60, confines the cut particles so that they are not conveyed or distributed elsewhere than to the second cutter blade, the same operation being associated with the next two cutter blades.

The present invention is directed to certain differential in peripheral or tip speeds of the cutter blades, the peripheral speed increasing in direction progressively from the remote cutter blade 36 to the near cutter blade 40. For example the peripheral or tip speed of the cutter blade 36 is preferably in the neighborhood of 15,000 feet per minute; the peripheral speed of the central cutter blade 38 is greater, and in the neighborhood of 16,000 feet per minute; and the peripheral speed of the near cutter blade 40 is greater yet, in the neighborhood of 17,000 feet per minute. These absolute speeds are merely representative, and the speeds may vary substantially from those mentioned, the consideration being that the speeds are progressively greater toward the discharge opening.

The central cutter blade 38 having a greater peripheral or tip speed than the first cutter blade not only performs its own cutting function in its line of movement or swath, but receives the particles cut by the first cutter blade and because of its greater peripheral or tip speed, it leads the cut particles ahead and intensifies the linear transmission or conveyance of the particles, and thereby eliminates churning or turbulence, working toward a single filamentary and continuous stream of air conveying the cut particles. The same phenomenon continues in relation to the near cutter blade 40, this blade having a peripheral speed greater than the central cutter blade 38, and the development of air stream and its transmission together with the conveyance of the cut particles therein is continued without churning or turbulence, in a single main stream, and out through the discharge opening 34.

As a result of the more effective and efficient conveyance of the cut particles, and elimination of turbulence, the specific action of cutting is improved, in that the particles are moved out of the region where they are cut and into the continuous air stream and carried away from the cutting region leaving the blades more free for the actual cutting operation.

As in the construction disclosed in the above mentioned patent, the cutter blades may have a slight transverse overlapping relation whereby to eliminate any lines extending fore and aft in which the crop plants are not cut; similarly the cutter blades may be relatively displaced axially, or vertically, if desired. The rearmost depending wall element 64 while not disposed directly adjacent the tips of the cutter blades, may provide extra protection against particles being thrown by the cutter blades.

We claim:

1. A mower adapted to be moved along the ground comprising a hood having an open bottom and a depending side wall surrounding the area covered by the hood except a lateral discharge opening and providing a reference side remote from said opening, cutter means in the hood comprising at least three impact cutters spaced linearly of a generally transverse path extending downstream from said reference side to the discharge opening, each cutter of said cutter means being adapted to cut plants thereahead within a portion of said path respectively registering therewith and to advance the plants cut thereby downstream into the path portion registering with the cutter disposed next adjacently thereto downstream of said path and for ultimate discharge of the cut plants through said opening, and means for operating the cutters at progressively increased effective speeds from said reference side toward said discharge opening for accelerating the movement of the cut plants from successive cutters and toward said discharge opening by impacting at increasing speeds against the successively transferred plants.

2. The invention according to claim 1 and one of the cutters being disposed adjacent to the discharge opening and delivering the plants directly therethrough, and said cutters developing a cut plant-entraining air stream toward said discharge opening.

3. A mower according to claim 2 wherein the cutters are three in number and arranged in a triangular pattern with the center one positioned forwardly and the other two to the side and rearwardly of the center one, and one of the side cutters being the terminal one adjacent said discharge opening, and flow of the air stream and conveyance of the cut plants is directed generally laterally from said terminal cutter.

4. A mower according to claim 1 in which the cutters are mounted on vertical shafts extending above the hood, and pulleys secured to the upper ends of the shafts, and common power transmitting means interconnecting the pulleys, the pulleys being of respective sizes corresponding to the different effective speeds of the cutter blades.

5. A mower according to claim 4 wherein the cutters are three in number and include a relatively large center one and relatively small side ones flanking the center one, and the small cutter remote from the discharge opening being driven at the slowest peripheral speed, the large cutter blade being driven at a faster peripheral speed and the other side blade adjacent to the discharge opening being driven at fastest peripheral speed.

6. The invention according to claim 1 and said cutters comprising a pair of short length side cutters and a long length center cutter, one of said side cutters being adjacent to said reference side and the other of the side cutters being adjacent to the discharge opening, and the center cutter extending forwardly of the side cutters, and the effective speeds being at the tips of said cutters.

* * * * *